US007325155B2

(12) United States Patent
Trantham et al.

(10) Patent No.: US 7,325,155 B2
(45) Date of Patent: Jan. 29, 2008

(54) EMBEDDED SYSTEM WITH REDUCED SUSCEPTIBILITY TO SINGLE EVENT UPSET EFFECTS

(75) Inventors: Jon D. Trantham, Chanhassen, MN (US); Gina R. Danner, Inver Grove Heights, MN (US); Mark A. Heath, Moore, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 575 days.

(21) Appl. No.: 10/940,919

(22) Filed: Sep. 14, 2004

(65) Prior Publication Data

US 2006/0069941 A1    Mar. 30, 2006

(51) Int. Cl.
*G06F 11/00* (2006.01)
(52) U.S. Cl. .......................................... 714/6
(58) Field of Classification Search .................... 714/6, 714/8, 12, 15
See application file for complete search history.

(56) References Cited

U.S. PATENT DOCUMENTS

| | | | | |
|---|---|---|---|---|
| 4,493,081 | A * | 1/1985 | Schmidt ..................... 714/754 |
| 5,313,627 | A * | 5/1994 | Amini et al. .................. 714/53 |
| 5,812,755 | A * | 9/1998 | Kool et al. ..................... 714/8 |
| 5,881,077 | A * | 3/1999 | Densham et al. ........... 714/800 |
| 6,510,076 | B1 | 1/2003 | Lapadat et al. ............. 365/154 |
| 6,625,756 | B1 * | 9/2003 | Grochowski et al. .......... 714/17 |
| 6,723,597 | B2 | 4/2004 | Abbott et al. ............... 438/238 |
| 6,901,540 | B1 * | 5/2005 | Griffith et al. ................. 714/48 |
| 6,931,582 | B2 * | 8/2005 | Tamura et al. .............. 714/758 |
| 2003/0221155 | A1 * | 11/2003 | Weibel et al. ............... 714/752 |
| 2004/0153763 | A1 * | 8/2004 | Grochowski et al. ......... 714/17 |
| 2004/0268202 | A1 * | 12/2004 | Haswell et al. ............. 714/752 |

OTHER PUBLICATIONS

Internet cite, www.cisco.com/warp/public/779/largeent/learn/technologies/ina/IncreasingNetworkAvailability-FAQ.pdf, "Frequently Asked Questions on Single Event Upsets (SEU) and Error Correcting Codes (ECC)", Prior to Sep. 14, 2004, pp. 1-5.

* cited by examiner

*Primary Examiner*—Nadeem Iqbal
(74) *Attorney, Agent, or Firm*—David K. Lucente; Derek J. Berger

(57) ABSTRACT

An embedded system with reduced susceptibility to single event upset effects. The system includes an instruction memory that can store at least one instruction set. The instruction memory utilizes a parity checking error-detection scheme. The system also includes a non-volatile memory that can store a copy of the at least one instruction set, and a data memory that can store at least one data sequence. The data memory utilizes an error correction coding (ECC) scheme. A controller, which is responsive to the instruction memory, the non-volatile memory, and the data memory, replaces the at least one instruction set in the instruction memory with the copy of the at least one instruction set from the non-volatile memory, if a parity error is detected in connection with the at least one instruction set in the instruction memory. The controller also operates in conjunction with the data memory to implement the ECC scheme.

19 Claims, 5 Drawing Sheets

FIG. 3-4

| 10110101 | 00111 |
| 00000101 | 10101 |

| 00100001 | 00111 |
| 10000110 | 10011 |

FIG. 3-5

| 10110101001000010000010110000110 | 0010011 |

FIG. 3-3

| 10110101001000010000010110000110 | 1 |

EMBEDDED SYSTEM WITH REDUCED SUSCEPTIBILITY TO SINGLE EVENT UPSET EFFECTS

FIELD OF THE INVENTION

The present invention relates generally to embedded systems, and more particularly but not by limitation to an embedded system with reduced susceptibility to single event upset effects.

BACKGROUND OF THE INVENTION

A typical embedded system (hardware and software which forms a component of some larger system and which is expected to function without human intervention) includes at least one integrated circuit memory such as a static random access memory (SRAM). A disc drive, utilized for data storage in modern electronic products ranging from digital cameras to computer systems and networks, is one such embedded system that includes integrated circuit memories.

Typically, a disc drive includes a mechanical portion, or head disc assembly (HDA), and electronics in the form of a printed circuit board assembly (PCBA), mounted to an outer surface of the HDA. The PCBA controls HDA functions and provides an interface between the disc drive and its host.

Generally, a HDA comprises moving parts such as one or more magnetic discs affixed to a spindle motor assembly for rotation at a relatively constant speed, an actuator assembly supporting an array of read/write heads that traverse generally concentric data tracks radially spaced across the disc surfaces, and a voice coil motor (VCM) providing rotational motion to the actuator assembly.

A disc drive PCBA includes a microcontroller and at least one integrated circuit memory, such as a SRAM, that stores program instructions and other data. The program instructions are executed by the microcontroller to thereby provide communication between the host computer and the HDA of the disc drive.

It is well known that the logic state of a SRAM bit cell can change if an energetic particle such as an alpha ($\alpha$) particle strikes the cell. Such "soft-error" or "single event upset" (SEU) effects can occur if an $\alpha$-particle strike generates, for a sufficient duration, a charge having a magnitude exceeding the critical charge in one of the cell's storage nodes (i.e. the minimum electrical charge needed to change the cell's logic state). Since trace amounts of $\alpha$-particle emitting constituents are unavoidably found in semiconductor packaging, silicon wafers, and especially in the naturally occurring radioactive lead (Pb) used in "flip-chip" packaging, any modern embedded system having a relatively large amount of integrated circuit memory is potentially susceptible to a significant soft-error rate.

The prior art has evolved various techniques for minimizing the susceptibility of integrated circuit memories, of the type included in embedded systems, to SEU effects. One approach, is to increase the memory cell's charging time constant and thereby decrease the cell's susceptibility to SEU effects. For example, an RC circuit can be interconnected between the two cross-coupled inverter stages in a typical six-transistor SRAM cell. An undesirable side effect of this approach is that the added capacitance increases the cell's write time. Another prior art approach is to add a small amount of capacitance and/or resistance to each of the cell's storage nodes. However, this significantly increases the cell's integrated circuit surface area, which is undesirable. In general, the prior art solutions, which have primarily focused on decreasing individual cell's susceptibility to SEU effects, have shortcomings such as high complexity and/or relatively high cost.

Embodiments of the present invention provide solutions to these and other problems, and offer other advantages over the prior art.

SUMMARY OF THE INVENTION

Disclosed is an embedded system with reduced susceptibility to single event upset effects. The system includes an instruction memory that can store at least one instruction set. The instruction memory utilizes a parity checking error-detection scheme. The system also includes a non-volatile memory, that can store a copy of the at least one instruction set, and a data memory that can store at least one data sequence. The data memory utilizes an error correction coding scheme. A controller, which is responsive to the instruction memory, the non-volatile memory, and the data memory, is configured to replace the at least one instruction set in the instruction memory with the copy of the at least one instruction set from the non-volatile memory if a parity error is detected in connection with the at least one instruction set in the instruction memory. The controller is further configured to operate in conjunction with the data memory to implement the error correction coding scheme.

Other features and benefits that characterize embodiments of the present invention will be apparent upon reading the following detailed description and review of the associated drawings.

BRIEF DESCRIPTION OF THE DRAWINGS

FIGS. 3-1 through 3-5 illustrate example error correction coding and parity checking schemes, which can be utilized in embodiments of the present invention.

FIG. 4 illustrates a flowchart of a method embodiment of the present invention.

DETAILED DESCRIPTION OF ILLUSTRATIVE EMBODIMENTS

The present invention provides an embedded system (such as a disc drive) with reduced susceptibility to single event upset (SEU) effects. In the present invention, the combined use of parity checking and error correction coding (ECC), for memory components of the embedded system, results in reduced susceptibility of the system to SEU effects.

Figure 1:
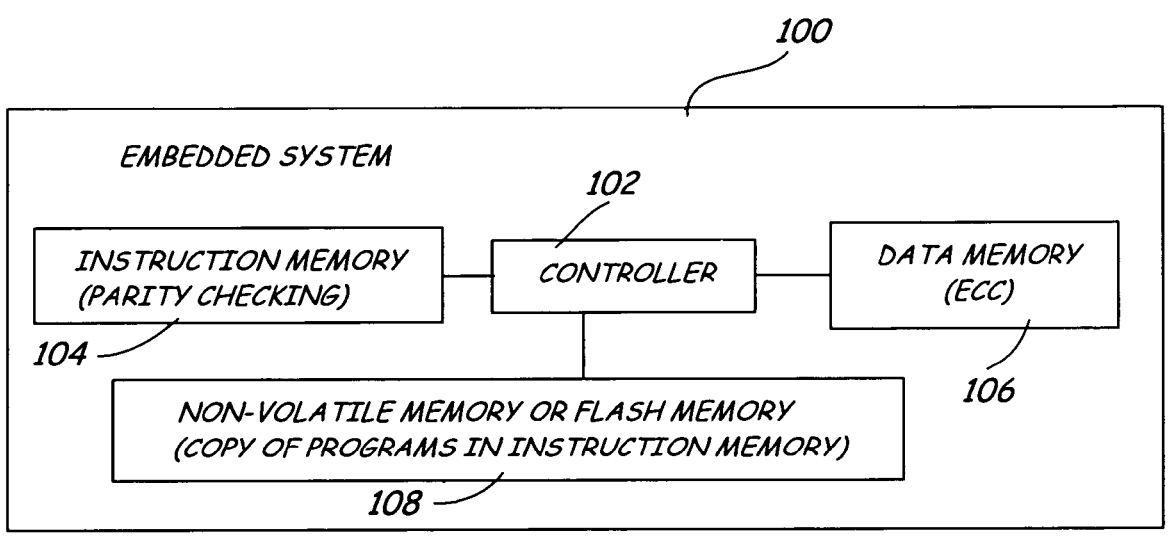
FIG. 1 is a simplified block diagram of an embedded system in accordance with an embodiment of the present invention.

FIG. 1 is a simplified block diagram of an embedded system 100 in accordance with an embodiment of the present invention. Embedded system 100 includes a controller (microprocessor/microcontroller) 102, an instruction memory 104, a data memory 106 and a flash memory (or, in general, a non-volatile memory) 108. Instruction memory 104 and data memory 106 are typically SRAMs and therefore individual bit cells of these memories are susceptible to SEU effects. However, individual storage units of non-volatile or flash memory 108 are not susceptible to SEU effects. Instruction memory 104 stores programs for execution by controller 102, and data memory 106 is utilized for storing information or data. Copies of instructions or programs stored in instruction memory 104 are also stored in flash memory 108. Thus, upon detection of single/multi bit errors in instruction memory 104, program instructions can be reloaded into instruction memory 104 from flash memory 108 which, as mentioned above, is not susceptible to SEU effects. It should be noted that during operation of embedded system 100, program instructions are read and executed by controller 102 from instruction memory 104, and not from flash memory 108, since instruction memory 104 allows relatively fast data-transfer rates.

To reduce the susceptibility of embedded system 100 to SEU effects, parity checking is utilized for instruction memory 104 and ECC is utilized for data memory 106. ECC is necessary for data memory 106 because, unlike the case of program instructions, multiple copies of data are not available for recovery in the example embedded system 100 shown in FIG. 1. On the other hand, parity is utilized for instruction memory 104 because it requires fewer memory bits than ECC to implement, and so is less expensive. This mixture of ECC and parity for the different memories allows for a solution that protects against SEUs more cost-efficiently than an ECC-only system.

In accordance with the present invention, controller 102, which is responsive to instruction memory 104, non-volatile memory 106, and data memory 108, is configured to replace an instruction set in instruction memory 104 with a corresponding instruction set from non-volatile memory 108, if a parity error is detected in connection with the instruction set in instruction memory 104. Controller 102 is further configured to operate in conjunction with data memory 108 to implement the ECC scheme. Details regarding the use of parity checking and ECC in a specific embedded system (disc drive data storage system) are provided below in connection with FIG. 2

Figure 2:
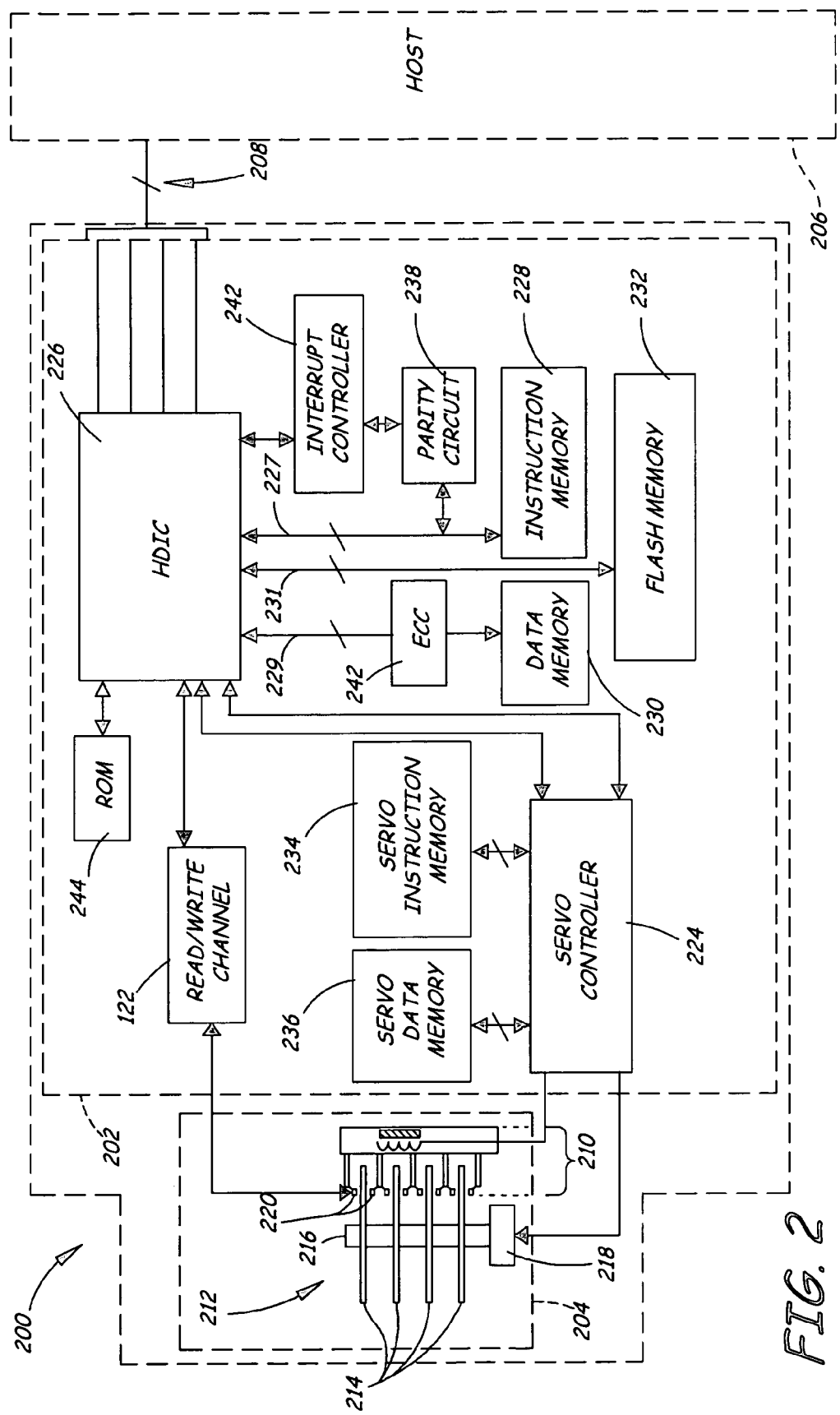
FIG. 2 is a simplified block diagram of a disc drive data storage system in accordance with an embodiment of the present invention.

Referring now to FIG. 2, a simplified block diagram of a disc drive data storage system 200 in accordance with an embodiment of the present invention is shown. Disc drive 200 includes, as its primary components, a head-disc assembly (HDA) 204 and a printed circuit board assembly (PCBA) 202. PCBA 202 includes a plurality of components (such as read/write channel 222, servo controller 224, and host interface and disc controller (HIDC) 226), that provide a target interface controller for communicating between a host system 206 and HDA 204. Host system 206 can include a microprocessor-based data processing system such as a personal computer or other system capable of performing a sequence of logical operations. Data is transmitted between host system 206 and PCBA 202 via a host bus connector 208. Host bus connector 208 may comprise any type of data exchange interface for coupling to a disc controller in a host computer such as SCSI (Small Computer System Interface), UDMA (Ultra Direct Memory Access), ATA (Advance Technology Attachment), FCAL (Fibre-Channel Arbitrated Loop), or other standards as are known in the industry or are developed in the future. HDA 204 includes an actuator assembly 210 and a disc assembly 212. Disc assembly 212 includes a plurality of media discs 214, stacked on a spindle assembly 216. Spindle assembly 216 is mechanically coupled to a spindle motor 218 for rotating discs 214 at a high rate of speed.

Actuator assembly 210 includes a voice coil motor and multiple actuator arms. Located at the end of each actuator arm are one or more transducer heads such as 220, which are associated with a respective disc surface. Transducer heads 220 communicate with read/write channel 222, which performs encoding and decoding of data written to and read from the disc by transducer heads 220.

Servo controller 224 controls the operation of actuator assembly 210 and spindle motor 218. Servo controller 224 maintains a substantially constant spin rate of spindle motor 218.

HIDC 226 communicates with host system 206 via host bus connector 208 by receiving commands and data from, and transmitting status and data back to, host system 206. In addition, HIDC 226 tracks the timing of data sectors passing under a currently selected transducer head and accordingly sends data to, and receives data from, read/write channel 222. Further, HIDC 226 provides for error correction and error detection on data transmitted to and read from discs 214.

As can be seen in FIG. 2, an instruction memory 228, a data memory 230 and a flash memory 232 are coupled to HIDC 226 via bus connectors 227, 229 and 231, respectively. Each of bus connectors 227, 229 and 231 are capable of carrying data and address information of data storage locations. In general, HIDC 226, instruction memory 228, data memory 230 and flash memory 232 operate in manner similar to controller 102 (FIG. 1) and memories, 104, 106 and 108 (FIG. 1) to reduce the susceptibility of the system to SEU effects. To implement parity checking for the contents of instruction memory 228, a parity checking circuit 238 is coupled to instruction memory 228 as shown in FIG. 2. An ECC circuit 240 is included between data memory 230 and HIDC 226 to provide error detection and correction for the contents of data memory 230. It should be noted that circuits 238 and 240 can comprise hardware, firmware or software. In some embodiments, circuits 238 and 240 may be a part of HIDC 226. Example parity checking and ECC schemes, which can be utilized with disc drive 200, are described further below in connection with FIGS. 3-1 through 3-5.

It should be noted that ECC/parity should preferably be generated on all write operations and checked on all read operations. Thus, on every instruction fetch from memory 228, carried out by HIDC 226, circuit 238 checks the parity and invokes an interrupt, via an interrupt controller 242, if a parity error is detected. Interrupt controller 242 may comprise hardware, firmware or software and, in general, is capable of prioritizing interrupt requests (IRQs) which it sends to HIDC 226. Upon receipt of an IRQ in connection with a parity error, HIDC 226 interrupts the incomplete instruction fetch operation. HIDC 226 then calls and executes an interrupt service routine (ISR). The ISR determines addresses corresponding to the information in error, recovers corresponding error-free data from flash memory 232, carries out a rewrite operation to replace the erroneous data and returns control to the calling program (program that carries out the instruction fetch). The incomplete instruction fetch operation is then resumed from the point where it was interrupted. In embodiments of the present invention, the IRQ and ISR for parity errors have a highest priority of all IRQs and ISRs. In some embodiments, the ISR for the parity error(s) is stored in a ROM 244, which is substantially immune to SEU effects, to reduce the chance of an error within the ISR itself.

When errors are detected by ECC circuit 240, it latches corresponding addresses, data and parity information into registers that are accessible to, or within, HIDC 226. Further, a counter (8-bit counter, for example) is incremented each time an error is detected by ECC circuit 240. The counter can be cleared with the help of HIDC 226 or other firmware.

In some embodiments, an interrupt is invoked on an ECC event and information related to the event is recorded.

In embodiments of the present invention, when ECC circuit 240 is unable to correct an error, it notifies HIDC 226 that an uncorrectable error has been encountered. Upon receipt of such a notification, HIDC 226 places disc drive 200 in an inoperable state (i.e., normal read/write operations cannot be carried out). Also, HIDC 226 activates a light emitting diode (LED), causing it to either flash or remain illuminated, when disc drive 200 is in an inoperable state.

In some embodiments, parity checking circuitry 238 and/or ECC circuitry 240 have on/off controls, which can be operated by HIDC 226, for example, to enable/disable the respective parity checking circuitry 238 and/or ECC circuitry 240. In some embodiments, a default state of circuitry 238 and 240 is off.

As can be seen in FIG. 2, servo controller 224 also has an associated instruction memory 234 and a data memory 236. In the disc drive embodiment shown in FIG. 2, due to the absence of a flash memory in which copies of servo program instructions can be stored for recovery, ECC is utilized for error detection and correction for servo instruction memory 234 and servo data memory 236. For simplification, error detection and correction circuitry for memories 234 and 236 are not shown. In general, ECC error handling in connection with memories 234 and 236 is carried out in a manner similar to that described above in connection with data memory 230, HIDC 226 and ECC circuit 240. In some embodiments of the present invention, an additional flash memory can be coupled to servo controller 224, thereby allowing for a combination of parity checking and ECC.

As mentioned above, in embodiments of the present invention, tracking of ECC errors (or events) are carried out by logging such errors in one or more registers. If a single register is used to track ECC errors in memories (234 and 236) coupled to servo controller 224 and memory 230 coupled to HIDC 226, an additional bit is utilized to distinguish between logged error information related to memories (234 and 236) coupled to servo controller 224 and logged error information related to memory 230 coupled to HIDC 226.

Figures 1, 3:
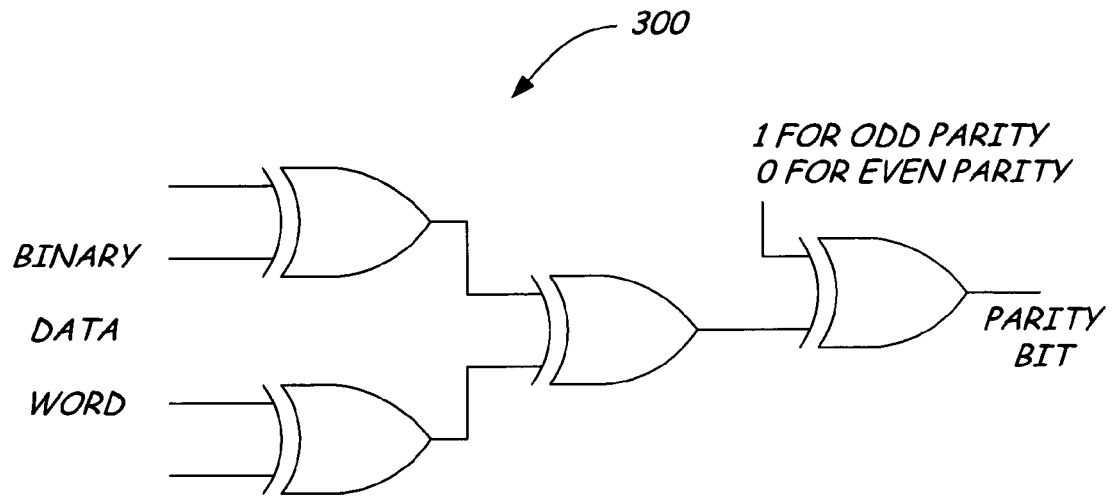
Figures 2, 3:
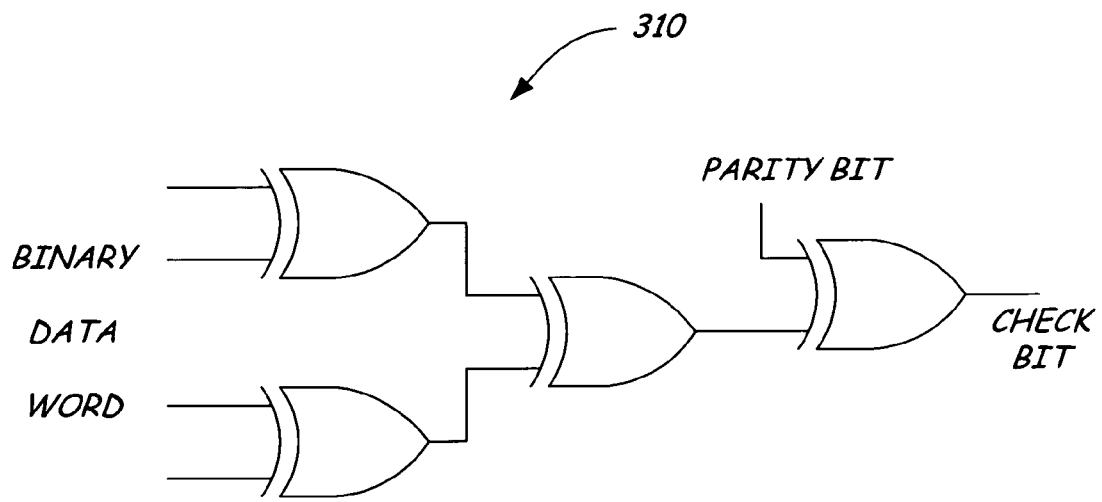

FIGS. 3-1 through 3-5 illustrate example parity checking and ECC schemes, which can be utilized in embodiments of the present invention. FIG. 3-1 shows a parity coding circuit 300, which forms a part of parity checking circuit 238. Parity coding circuit 300, which includes multiple Exclusive-OR (XOR) gates connected in a manner shown in FIG. 3-1, attaches a parity bit as a least-significant bit to each binary data word (or code group) to be stored in instruction memory 228. Each new data word (known as the total group), created by circuit 300, is thus the original code group with the parity bit appended.

FIG. 3-2 shows a parity decoding circuit 310, which also forms a portion of parity checking circuit 238. As can be seen in FIG. 3-2, a configuration of XOR gates, similar to the configuration shown in FIG. 3-1, is also employed to form parity decoding circuit 310. A check bit output by parity decoding circuit 310 will equal 0 if even parity is used and will equal 1 if odd parity is employed.

For simplification, in FIGS. 3-1 and 3-2 described above, parity coding circuit 300 and parity decoding circuit 310 for 4-bit data words have been shown. It should be noted that a parity checking scheme for data words having a larger number of bits can be easily implemented by simply connecting a suitable larger number of XOR gates in configurations similar to those shown in FIGS. 3-1 and 3-2.

In embodiments of the present invention, all writes and reads to instruction memory 228 are carried out on a 32-bit basis. FIG. 3-3 shows such a 32-bit code group combined with the parity bit, added by a parity coding circuit (similar to circuit 300, but with a suitable larger number of XOR gates), to form a total group of 33 bits.

In general, for implementation of ECC, an additional number of bits are added to each word. The more bits that are included for a given amount of data, the more errors that can be tolerated. Any suitable ECC scheme, such as a Hamming code, may be used with the present invention.

Figure 4:
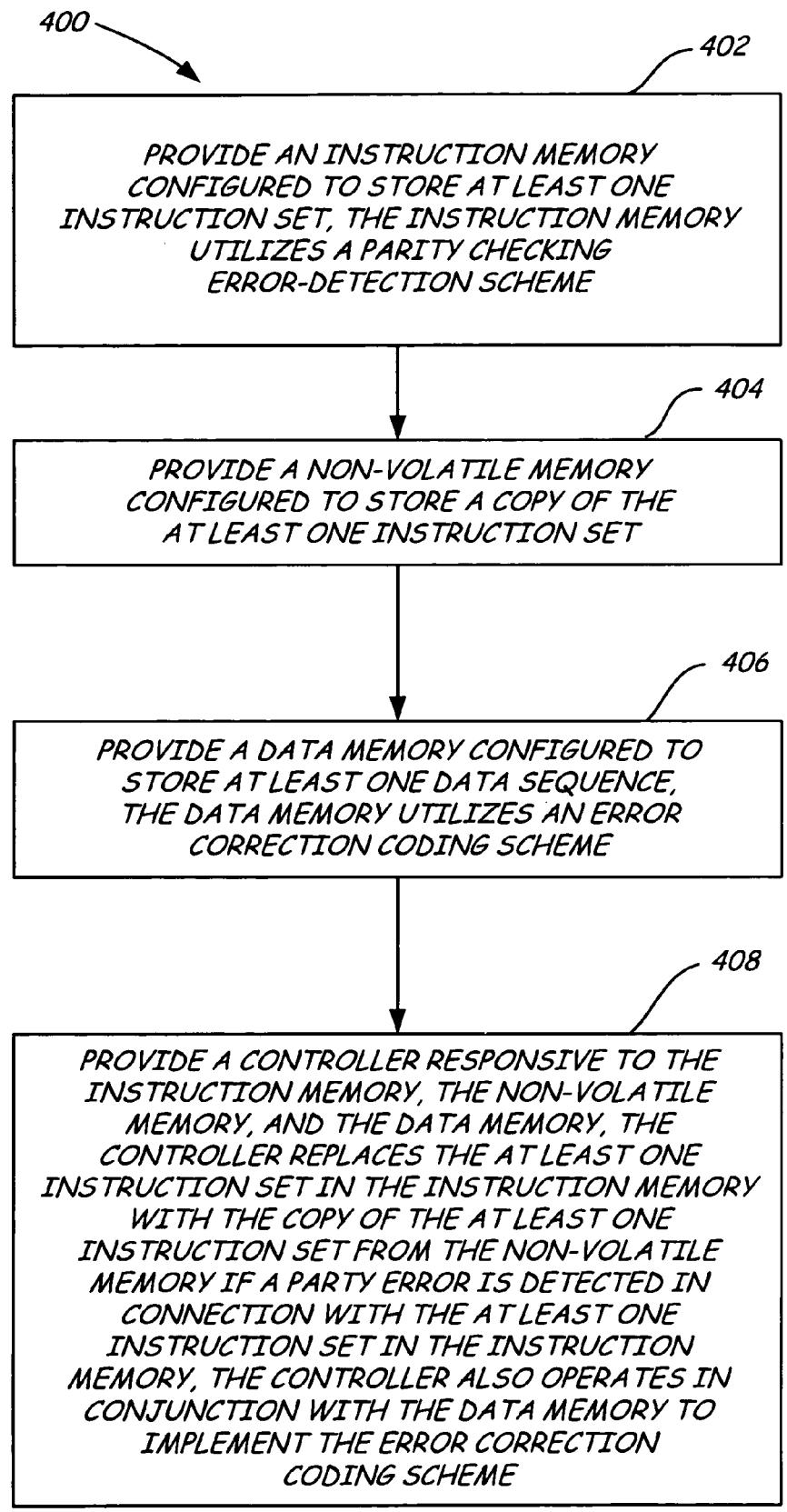

FIG. 3-4 illustrates one suitable ECC scheme in which individual addressability for each byte is maintained by utilizing a 5-bit ECC per byte. A preferred alternative is to store data in 32 bit words. Here, hardware can be added to maintain byte-addressability (i.e., to maintain support for 8-bit, 16 bit and 32-bit reads and writes) in a manner that is transparent to HIDC 226, except for additional wait states. The 32 bit word is protected by 7 bits of ECC as illustrated by FIG. 3-5. In this embodiment, 32 bits can be read, and a subset (less than all) of these bits (8 or 16 bits) can be modified. After the subset of the 32 bits is modified, ECO can be re-computed for the entire 32-bits. The re-computed ECO and modified information can be written back to memory.

Referring now to FIG. 4, a flowchart 400 representing a method of making an embedded system with reduced susceptibility to single event upset effects is shown. At step 402, an instruction memory configured to store at least one instruction set is provided. The instruction memory utilizes a parity checking error-detection scheme. At step 404, a non-volatile memory configured to store a copy of the at least one instruction set is provided. At step 406, a data memory configured to store at least one data sequence is provided. The data memory utilizes an error correction coding scheme. At step 408, a controller responsive to the instruction memory, the non-volatile memory, and the data memory is provided. The controller is configured to replace the at least one instruction set in the instruction memory with the copy of the at least one instruction set from the non-volatile memory if a parity error is detected in connection with the at least one instruction set in the instruction memory. The controller is further configured to operate in conjunction with the data memory to implement the error correction coding scheme. Different techniques, some of which are set forth above, can be employed to carry out the steps shown in the flowchart of FIG. 4 while maintaining substantially the same functionality without departing from the scope and spirit of the present invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive data storage system while maintaining substantially the same functionality without departing from the scope and spirit of the present invention. In addition, although the preferred embodiment described herein is directed to a disc drive data storage system with reduced susceptibility to single event upset effects, it will be appreciated by those skilled in the art that the teachings of the present invention can be applied to any embedded system, without departing from the scope and spirit of the present invention.

It should noted that, in embodiments of the present invention, each of controllers 102, 224 and 226 comprises hardware and firmware and may be formed of one or more integrated circuits, which are capable of carrying out the functions described earlier. Further, in some embodiments, controllers 224 and 226 of disc drive 200 may be implemented as a single unit (single integrated circuit).

What is claimed is:

1. An apparatus comprising:
   an instruction memory configured to store at least one instruction set, the instruction memory utilizing a parity checking error-detection scheme;
   a non-volatile memory configured to store a copy of the at least one instruction set;
   a data memory configured to store at least one data sequence, the data memory utilizing an error correction coding scheme; and
   a controller responsive to the instruction memory, the non-volatile memory, and the data memory, the controller configured to replace the at least one instruction set in the instruction memory with the copy of the at least one instruction set from the non-volatile memory if at least one parity error is detected in connection with the at least one instruction set in the instruction memory, the controller further configured to operate in conjunction with the data memory to implement the error correction coding scheme.

2. The apparatus of claim 1 further comprising a parity checking circuit, which is configured to detect the at least one parity error in the at least one instruction set and to invoke an interrupt, which results in the controller replacing the at least one instruction set in the instruction memory with the copy of the at least one instruction set from the non-volatile memory.

3. The apparatus of claim 2 wherein the parity checking circuit is further configured to carry out a parity check upon each instruction fetch of a plurality of instruction fetches carried out by the controller.

4. The apparatus of claim 1 further comprising an error correction coding circuit, which operates in conjunction with the controller to implement the error correction coding scheme.

5. The apparatus of claim 4 wherein the error correction coding circuit is configured to operate in conjunction with the controller to record detected errors.

6. The apparatus of claim 1 wherein the embedded system is a disc drive and wherein the controller is a host interface disc controller.

7. The apparatus of claim 6 wherein the host interface disc controller is configured to render the disc drive inoperable when an uncorrectable error is encountered.

8. The apparatus of claim 7 wherein the host interface disc controller is further configured to illuminate a light emitting diode when the disc drive is rendered inoperable.

9. The apparatus of claim 1 further comprising a parity checking circuit and an error correction coding circuit, wherein the controller is further configured to enable/disable the parity checking circuit and the error correction coding circuit.

10. The apparatus of claim 9 wherein a default state of the parity checking circuit and the error correction coding circuit is a disabled state.

11. A method comprising:
    (a) providing an instruction memory configured to store at least one instruction set, the instruction memory utilizing a parity checking error-detection scheme;
    (b) providing a non-volatile memory configured to store a copy of the at least one instruction set;
    (c) providing a data memory configured to store at least one data sequence, the data memory utilizing an error correction coding scheme; and
    (d) providing a controller responsive to the instruction memory, the non-volatile memory, and the data memory, the controller configured to replace the at least one instruction set in the instruction memory with the copy of the at least one instruction set from the non-volatile memory if at least one parity error is detected in connection with the at least one instruction set in the instruction memory, the controller further configured to operate in conjunction with the data memory to implement the error correction coding scheme.

12. The method of claim 11 further comprising providing a parity checking circuit, which is configured to detect the at least one parity error in the at least one instruction set and to invoke an interrupt, which results in the controller replacing the at least one instruction set in the instruction memory with the copy of the at least one instruction set from the non-volatile memory.

13. The method of claim 12 wherein the parity checking circuit is further configured to carry out a parity check upon each instruction fetch of a plurality of instruction fetches carried out by the controller.

14. The method of claim 11 further comprising providing an error correction coding circuit, which operates in conjunction with the controller to implement the error correction coding scheme.

15. The method of claim 14 wherein the error correction coding circuit is configured to operate in conjunction with the controller to record detected errors.

16. The method of claim 11 wherein the embedded system is a disc drive and wherein the controller is a host interface disc controller.

17. The method of claim 16 wherein the host disc interface controller is configured to render the disc drive inoperable when an uncorrectable error is encountered.

18. The method of claim 17 wherein the head disc interface controller is further configured to illuminate a light emitting diode when the disc drive is rendered inoperable.

19. The method of claim 11 further comprising providing a parity checking circuit and an error correction coding circuit, wherein the controller is further configured to enable/disable the parity checking circuit and the error correction coding circuit.

* * * * *